United States Patent [19]

Bolle, Jr. et al.

[11] Patent Number: 4,749,219

[45] Date of Patent: Jun. 7, 1988

[54] VACUUM LIFT ASSEMBLY

[75] Inventors: Fred Bolle, Jr., Milford; John R. Herronen, Linden; Joseph M. Wright, Fenton, all of Mich.

[73] Assignee: Tek-Matik, Inc., Hartland, Mich.

[21] Appl. No.: 926,323

[22] Filed: Jun. 7, 1988

[51] Int. Cl.⁴ .............................................. B25J 15/06
[52] U.S. Cl. .................................. 294/64.1; 271/103; 414/752
[58] Field of Search .................. 294/64.1; 271/90, 94, 271/102, 103, 107, 108; 414/121, 627, 737, 744 B, 752

[56] References Cited

U.S. PATENT DOCUMENTS

| | | | |
|---|---|---|---|
| 4,548,396 | 10/1985 | Nelen | 294/64.1 X |
| 4,600,229 | 7/1986 | Oten | 294/64.1 |
| 4,674,784 | 6/1987 | Wooley | 294/64.1 |

FOREIGN PATENT DOCUMENTS

| | | | |
|---|---|---|---|
| 1109152 | 4/1968 | United Kingdom | 294/64.1 |
| 298516 | 3/1971 | U.S.S.R. | 294/64.1 |
| 256971 | 6/1971 | U.S.S.R. | 294/64.1 |
| 342712 | 6/1972 | U.S.S.R. | 294/64.1 |

*Primary Examiner*—Johnny D. Cherry
*Attorney, Agent, or Firm*—Krass & Young

[57] ABSTRACT

A vacuum lift assembly for lifting sheet members to an elevated position. The assembly comprises an air power cylinder vertically positioned with its piston rod projecting downwardly out of the cylinder; a mounting plate to which the mounting flange on the lower end of the cylinder of the cylinder assembly is mounted; a collar extending rigidly downwardly from the mounting plate in surrounding coaxial relation to the piston rod of the cylinder assembly; a block member secured to the lower end of the piston rod and including a bore at its lower end coacting with a vacuum cup secured to the lower end of the block member to define a vacuum cavity; and a lever extending generally vertically at one side of the block member, pivoted intermediate its upper and lower ends on the block member, carrying a seal member at its lower end for respectively opening and closing a vent passage communicating with the bore in the lower end of the block member, and a cam portion adjacent its upper end sized and configured to engage the lower end of the collar in response to upward movement of the piston rod and then guide upwardly along the inner periphery of the collar member as the block member and lever are moved nestingly into the collar member so as to move the lever to its open position against the bias of a coil spring carried by the block member and engaging the upper end of the lever.

10 Claims, 2 Drawing Sheets

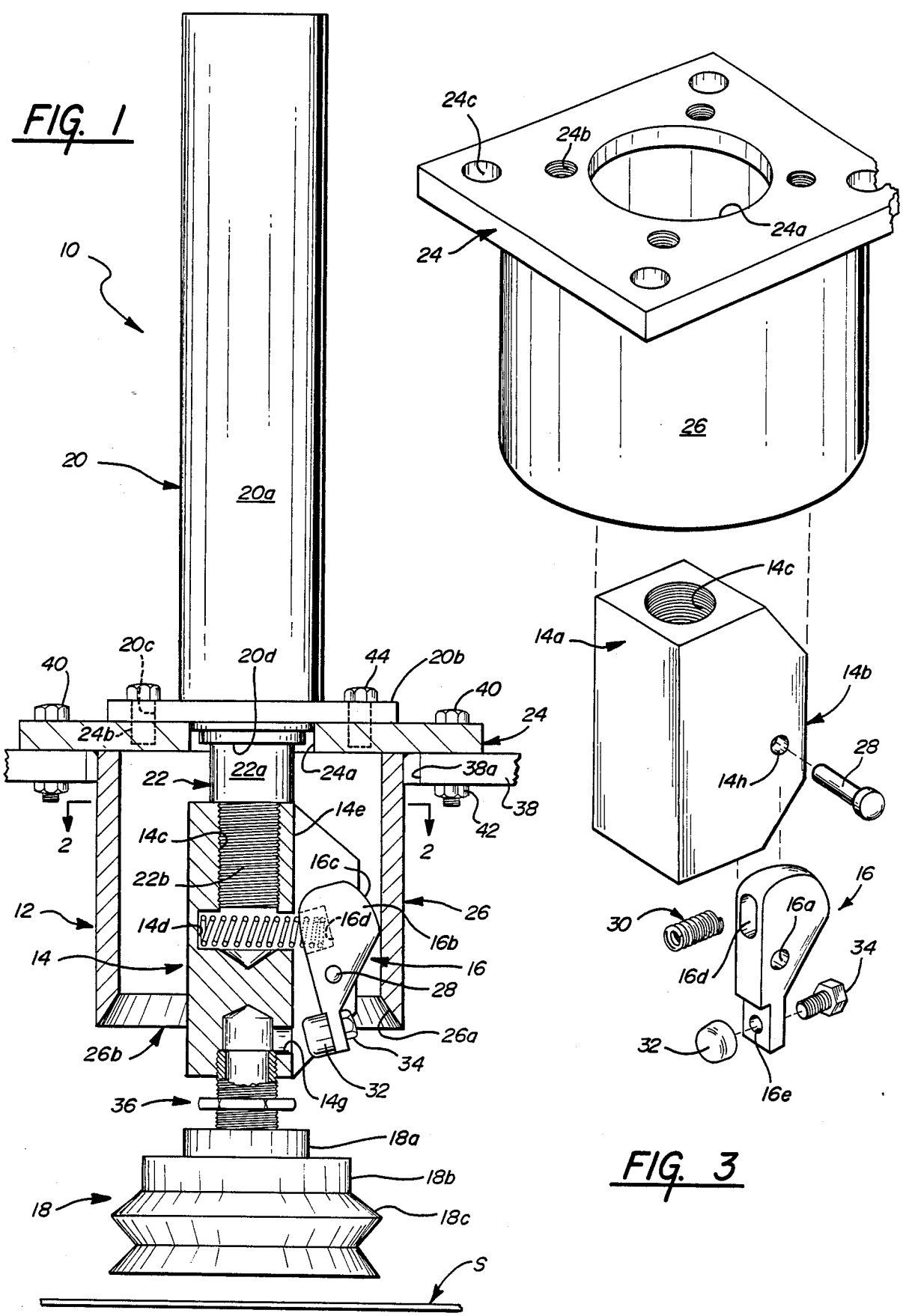

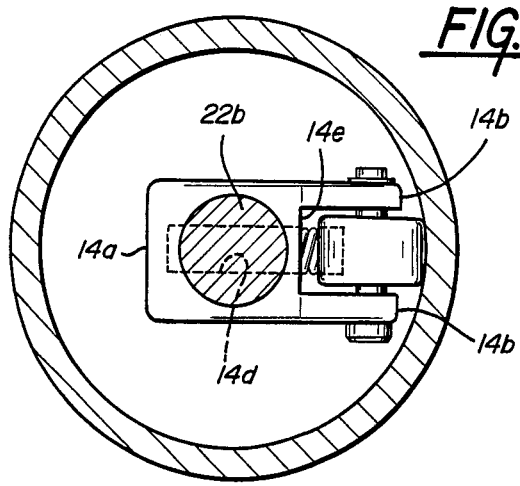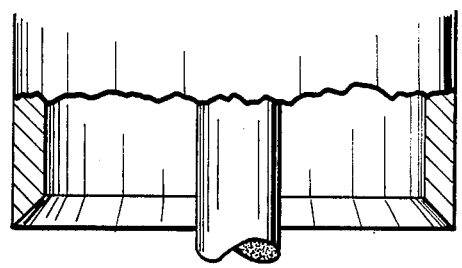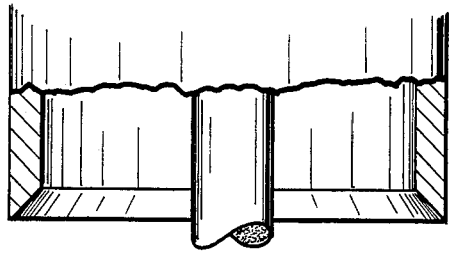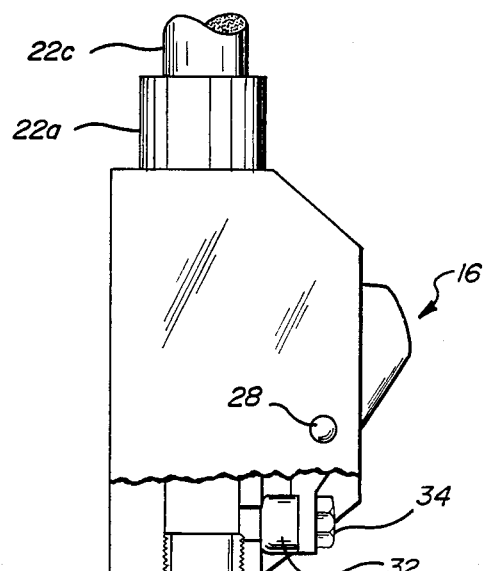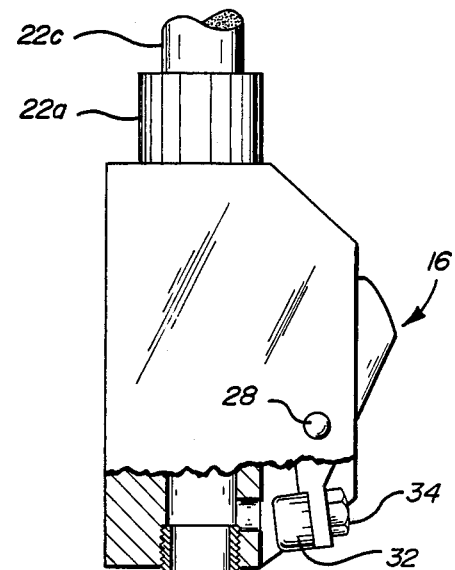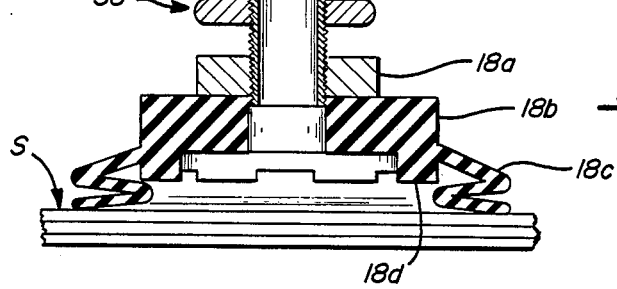

VACUUM LIFT ASSEMBLY

BACKGROUND OF THE INVENTION

This invention relates to lift assemblies for lifting sheet members and more particularly to lift assemblies of the type utilizing a vacuum to grip the sheet member.

Various vacuum assemblies have been proposed to grip sheet members at one level, move them to a higher level, and then release them at the higher level for subsequent processing. Whereas these prior art vacuum lift assemblies have been generally satisfactory, they have either required complex mechanisms or controls to effectuate the gripping or releasing actions, and/or have required a separate vacuum pump apparatus to effectuate the gripping and lifting action.

SUMMARY OF THE INVENTION

This invention is directed to the provision of a vacuum lift assembly that is extremely simple in construction and operation and that does not require a separate vacuum pump apparatus.

The invention vacuum lift assembly includes a power cylinder assembly including a cylinder member mounted in a vertically extending position and a piston rod projecting downwardly out of the lower end of the cylinder member; vacuum gripper means on the lower end of the piston rod defining a vacuum cavity having a lower opening closed by downward movement of the gripper means into contact with a sheet member to be lifted; a valve member mounted on the vacuum gripper means movable between a closed position sealing the vacuum cavity and an open position venting the vacuum cavity; spring means urging the valve member toward its closed position; and actuator means rigid with the cylinder member engageable with the valve member in response to upward movement of the piston rod and operative to move the valve member to its open position against the bias of the spring means to vent the vacuum cavity and release a gripped sheet member. With this arrangement, the gripper means may be moved downwardly by the power cylinder to engage a sheet member, whereafter the piston rod may be moved upwardly to move the valve member into engagement with the actuator means to vent the vacuum cavity and release the gripper sheet member at a predetermined higher level.

According to a further feature of the invention, the vacuum gripper means comprises a block member secured at its upper end to the lower end of the piston rod and a downwardly opening resilient vacuum cup secured at its upper end to the lower end of the block member; the vacuum cavity is defined by the hollow of the vacuum cup and a cavity in the lower end of the block member communicating with the hollow of the vacuum cup; and the valve member respectively vents and seals the block member cavity as it moves between its open and closed positions. With this arrangement, as the gripper means is moved downwardly onto a sheet member, the bellows structure of the vacuum cup collapses to reduce the volume of the vacuum cavity with the valve member opening against the bias of the spring means to vent air from the vacuum cavity, whereafter the valve member closes under the bias of the spring means to seal the vacuum cavity and maintain the vacuum condition so as to grip the sheet member, whereafter, following a predetermined amount of upward movement of the piston rod corresponding to the desired amount of lift to be imparted to the sheet member, the valve member engages the actuator means and is moved to its open position to vent the vacuum cavity and release the gripped sheet member.

According to a further feature of the invention, the actuator member comprises a collar member rigid with the lower end of the cylinder member of the power cylinder assembly and coaxially surrounding the piston rod of the power cylinder assembly. This structure provides a convenient and simple means of operating the valve member in response to upward movement of the piston rod.

According to a further feature of the invention, the valve member is a lever pivoted to the block member and having a cam surface engageable with the lower annular end of the collar member as the piston rod is moved upwardly with the block member to move the valve lever to the valve open position and vent the block member cavity to release a gripped sheet member. This arrangement provides a simple and effective means of venting the vacuum cavity at the desired predetermined lift level.

According to a further feature of the invention, the collar member is sized to receive the block member and lever in nesting relation therewithin; and the lever extends generally vertically at one side of the block member, is pivoted intermediate its upper and lower ends on the block member, is operative at its lower end to selectively vent and seal the block member cavity, and includes a cam portion adjacent its upper end sized and configured to engage the lower end of the collar member in response to upward movement of the piston rod and then guide upwardly along the inner periphery of the collar member as the block member and lever move nestingly into the collar member. This arrangement provides a simple, compact, inexpensive and effective structure for moving the valve lever between its open and closed positions.

According to a further feature of the invention, the lift assembly further includes a mounting plate member having a central aperture; the lower end of the cylinder is mounted to the upper face of the mounting plate member with the piston rod extending downwardly through the central aperture in the mounting plate member; and the collar member is rigidly secured to the underface of the mounting plate coaxial with the central aperture and extending downwardly from the mounting plate in surrounding and coaxial relation to the piston rod. This arrangement provides a simple, inexpensive and durable subassembly structure for mounting the power cylinder assembly and the collar of the invention lift assembly.

In the disclosed embodiment of the invention, the block member includes a central axial threaded bore opening in its upper end for receipt of the threaded lower end of the piston rod, a central axial bore opening at its lower end to define the block member cavity, a blind transverse passage opening at the lever side of the block member, and a transverse vent passage communicating with the upper end of the block member cavity and opening at the lever side of the block member; and the spring means comprises a coil spring positioned in the blind transverse passage in the block member and received at its free end in a socket defined in the upper end of the valve lever. This specific block member construction facilitates the inexpensive construction of the vacuum lift assembly and facilitates the effective and reliable operation of the assembly.

BRIEF DESCRIPTION OF THE DRAWINGS

FIG. 1 is an elevational view of the invention vacuum lift assembly;

FIG. 2 is a cross-sectional view taken on line 2—2 of FIG. 1;

FIG. 3 is an exploded perspective view showing a subassembly of the invention vacuum lift apparatus; and FIGS. 4 and 5 are further elevational views of the invention vacuum lift assembly depicting different steps in the operation of the lift assembly.

DETAILED DESCRIPTION OF THE PREFERRED EMBODIMENT

The invention vacuum lift assembly includes a power cylinder assembly 10, an actuator assembly 12, a block member 14, a valve member 16, and a vacuum cup 18.

Power cylinder assembly 10 is air actuated and of known construction and operation. Assembly 10 includes a cylinder member 20 and a piston rod 22 projecting downwardly out of the lower end of cylinder member 20.

Cylinder member 20 includes a main body cylindrical portion 20a slideably receiving the piston (not shown) of the assembly and a lower circular mounting flange portion 20b including a plurality of circumferentially arranged mounting holes 20c. Cylinder assembly 10 receives pressurized air from a source (not shown) for moving the piston and piston rod up and down with respect to the cylinder member 20 in response to suitable admission and venting of pressurized air into the cylinder member.

Piston rod 22 includes a collar portion 22a, a threaded lower end portion 22b, and a main shaft portion 22c.

Actuator assembly 12 includes a mounting plate 24 and a collar 26. Mounting plate 24 is rectangular and includes a central circular aperture 24a, four tapped bores 24b arranged in circumferential, coaxial relation around central bore 24a, and four through bores 24c positioned in the four corners of the plate.

Collar 26 is welded to the underface of place 24 in coaxial relation to central aperture 24a and includes an inwardly and upwardly extending bevel surface 26a adjacent its lower annular end 26b.

Block member 14 is formed from a block of suitable metallic material and includes a main body portion 14a and a pair of laterally spaced vertically extending flange portions 14b.

A central threaded bore 14c is provided in the upper end of main body portion 14a and opens in the upper end of the block member. A blind transverse bore 14d intersects the lower end of bore 14c and opens in the righthand face 14e of main body portion 14a between spaced flange portions 14b. A central tapped bore 14f open in the lower end of the main body portion of the block member and a transverse vent passage 14 opens at its left end in the upper end of bore 14f and at its right end in the righthand face 14e of the block member main body portion between spaced flange portions 14b.

Valve member 16 comprises a lever pivotally mounted intermediate its upper and lower ends to block member 14 in a position between flange portions 14b by a pin member 28 extending through aligned apertures 14h in block member flange portions 14b and an aperture 16a in lever 16. The upper end of lever 16 includes a cam portion 16d defining a cam surface 16c and further includes a socket or slot 16d positioned in confronting relation to tranverse bore 14d of block member 14. A coil spring 30 is positioned with its one end in the blind end of transverse bore 14d and its other end received in socket 16d of lever 16. A resilient button member 32 is secured to the lower end of lever 16 by a bolt 34 passing through an aperture 16e in the lower end of the lever.

Vacuum cup member 18 is secured to the lower end of block member 14 by a pipe nipple 36 threaded at its upper end into the lower end of block member bore 14f and threaded at its lower end to a rigid mounting portion 18a on the upper end of the vacuum cup. Vacuum cup 18 is of known construction and may be formed of any suitable natural or synthetic rubber material such, for example, as neoprene. Cup 18 includes an upper relatively rigid reinforced portion 18b, a lower collapsible bellows structure portion 18c, and spacer member portions 18d extending downwardly from upper portion 18b. The hollow interior of bellows structure 18c communicates with bore 14f in block member 14 through a central aperture 18e in upper portion 18b and through pipe nipple 36.

In the assembled relation of the invention vacuum lift assembly, as best seen in FIG. 1, mounting plate 24 of actuator member 12 is positioned on the upper face of a suitable frame plate member 38 with collar 26 passing downwardly through a central aperture 38a in the frame plate; bolts 40 pass through apertures 24c in the mounting plate 24 and through aligned apertures in frame plate 38 for coaction with nuts 42 to secure the mounting plate to the frame plate; bolts 44 pass downwardly through apertures 20c in mounting flange portion 20b for threaded coaction with threaded bores 24b in mounting plate 24 to secure cylinder 20 to the upper face of mounting 24 with piston rod 22 extending downwardly and coaxially through aperture 24a in coaxial relation to collar 26; the lower threaded end 22b of piston rod 22 is theadably received in block member bore 14c to secure the upper end of the block member to the lower end of the piston member with the upper face of the block member seating against piston rod collar portion 22a; lever 16 is pivotally mounted to block member 14 between block member flange portions 14b with spring 30 biasing the lever to its closed position in which resilient button 32 covers vent passage 14g; and suction cup 18 is secured to the lower end of block member 14 by pipe nipple 36 with the hollow interior of the vacuum cup communicating with bore 14f of the block member through the pipe nipple.

In operation, cylinder assembly 10 is actuated to extend piston rod 22 downwardly out of the cylinder member 20 and move vacuum cup 18 into contact with the upper sheet of a stack of sheets S as seen in FIG. 4. At this time, spring 30 acts to maintain lever 16 in a closed position in which button 32 seals vent passage 14g of the block member. However, as the piston rod continues to move downwardly out of the cylinder, the bellows structure 18c of the vacuum cup is collapsed to the extent permitted by spacer member portions 18d, as seen in FIG. 5, to decrease the volume of the hollow of the vacuum cup and force air upwardly through bellows aperture 18e and through pipe nipple 36 into block member bore 14f from where it exits through vent passage 14g with the air pressure displacing sealing button 32 against the bias of coil spring 30 to allow the air to escape. As soon as the bellows structure 18c has completed its collapsing movement, lever 16 again moves to its closed position under the bias of spring 30 so that, as the lift assembly begins its upward lifting movement and the bellows structure 18c moves to its expanded configuration of FIG. 4, a vacuum condition is created within the vacuum cavity defined by the hollow of the bellows and by block member bore 14f so that the upper sheet of the stack of sheets is adhered to the vacuum cup and is lifted as the lift assembly continues its upward movement.

After the lift assembly has moved through a predetermined amount of desired upward movement corresponding to the desired amount of lift to be imparted to the sheet member, cam surface 16c on cam portion 16b of lever 16 engages the lower annular end 26b of collar 12, whereafter, as seen in FIG. 1, the cam portion 16b rides upwardly along collar beveled edge 26a and thence upwardly along the interior circumference of the collar to move the lever to its open position in which vent passage 14g is opened and the vacuum cavity is vented to relieve the vacuum condition and release the gripped sheet member at its desired elevated position. The extreme upward or raised position of the lift assembly is defined by engagement of piston rod collar portion 22a with the end wall portion 20d of cylinder member 20.

It will be understood that the released sheet member is picked up by a conveyor member of the like positioned at the elevated level to carry the sheet member to a work station for subsequent processing. Once the sheet member has been released, the block member and vacuum cup are moved downwardly by downward movement of the piston rod. As the cam portion 16b of the lever 16 moves downwardly out of its nesting position within the collar member, spring 30 again acts to return the lever 16 to its closed position where it stays until the vacuum cup 18 engages the next sheet on the stack of sheets, whereafter the lever 16 is opened to vent the vacuum chamber in response to collapsing movement of the bellows structure of the vacuum cup to allow the creation of a vacuum condition to grip the next sheet in the stack.

It will be seen that the invention vacuum lift assembly is extremely simple and reliable in construction and functions to effectively and positively lift sheet members to an elevated position without the use of any elaborate control mechanism to effectuate the gripping or releasing operations and without requiring a separate vacuum pump apparatus.

Whereas a preferred embodiment of the invention has been illustrated and described in detail, it will be apparent that various changes may be made in the disclosed embodiment without departing from the scope of spirit of the invention.

We claim:

1. A vacuum lift assembly for lifting sheet members, said assembly comprising:
   (A) a power cylinder assembly including a cylinder member and a piston rod projecting out of said cylinder member;
   (B) vacuum gripper means comprising a block member drivingly connected to said piston rod and a downwardly opening resilient vacuum cup secured at its upper end to a lower end of said block member and defining a downwardly opening cavity, said block member including a cavity in its lower end communicating with the cavity of said vacuum cup to define a vacuum cavity having a lower opening closed by downward movement of said vacuum cup into contact with a sheet member to be lifted;
   (C) a valve lever pivotally mounted on said block member, pivotally movable between a closed position sealing said vacuum cavity and an open position venting said vacuum cavity, and including a cam surface positioned laterally on said block member;
   (D) spring means urging said valve lever toward its closed position; and
   (E) a fixed actuator member rigid with respect to said cylinder and positioned to be engaged by said valve lever cam surface in response to upward movement of said vacuum gripper means and operative to move said valve lever to its open position against the bias of said spring means to vent said vacuum cavity and release a gripped sheet member.

2. A vacuum lift assembly according to claim 1 wherein:
   (F) said actuator member comprises a collar member rigid with the lower end of said cylinder member and coaxially surrounding said piston rod.

3. A vacuum lift assembly for lifting sheet members, said assembly comprising:
   (A) a power cylinder assembly including a cylinder member mounted in a vertically extending position and a piston rod projecting downwardly out of the lower end of said cylinder member;
   (B) vacuum gripper means on the lower end of said piston rod including a block member secured at its upper end to the lower end of said piston rod and a downwardly opening resilient vacuum cup secured at its upper end to the lower end of said block member and defining a downwardly opening cavity, said block member including a cavity in its lower end communicating with the cavity of said vacuum cup to define a vacuum cavity having a lower opening closed by downward movement of said vacuum cup into contact with a sheet member to be lifted;
   (C) a valve lever pivotally mounted on said block member, pivotally movable between a closed position sealing said vacuum cavity and an open position venting said vacuum cavity, and including a cam surface;
   (D) spring means urging said valve lever toward its closed position; and
   (E) a collar member rigid with the lower end of said cylinder member, coaxially surrounding said piston rod, and including a lower annular end engageable with said cam surface on said valve lever as said piston rod is moved upwardly with said block member to move said lever to the valve open position and vent said block member cavity to release a gripped sheet member.

4. A vacuum lift assembly according to claim 3 wherein:
   (F) said collar member is sized to receive said block member and said lever in nesting relation therewithin; and
   (G) said lever extends generally vertically at one side of said block member, is pivoted intermediate its upper and lower ends on said block member, is operative at its lower end to selectively vent and seal said block cavity, and includes a cam portion adjacent its upper end sized and configured to engage the lower end of said collar member in response to upward movement of said piston rod and then guide upwardly along the inner periphery of said collar member as said block member and lever move nestingly into said collar member.

5. A vacuum lift assembly according to claim 4 wherein:
(H) the lower end of said collar member is beveled inwardly and upwardly to facilitate movement of said lever cam portion upwardly into said collar member.

6. A vacuum lift assembly according to claim 4 wherein:
(H) said lift assembly further includes a mounting plate member having a central aperture;
(I) said lower end of said cylinder is mounted to the upper face of said mounting plate member with said piston rod extending downwardly through said central aperture; and
(J) said collar member is rigidly secured to the underface of said mounting plate member coaxial with said central aperture and extending downwardly from said mounting plate member in surrounding and coaxial relation to said piston rod.

7. A vacuum lift assembly according to claim 4 wherein:
(H) said piston rod includes a threaded lower end;
(I) said block member includes
  (1) a central axial threaded bore opening in the upper end of said block member for receipt of the threaded lower end of said piston rod,
  (2) a central axial bore opening in the lower end of said block member to define said block member cavity,
  (3) a blind transverse passage opening at said one side of said block member, and
  (4) a transverse vent passage communicating with the upper end of said block member cavity and opening at said one side of said block member; and
(J) said spring means comprises a coil spring positioned in said blind transverse passage and received at its free end in a socket defined in said upper end of said lever.

8. A vacuum lift assembly according to claim 7 wherein:
(K) a resilient sealing button is secured to said lower end of said lever for sealing coaction with said vent passage to vent and seal said block member cavity.

9. A vacuum lift assembly for lifting sheet members, said assembly comprising:
(A) a power cylinder assembly including a cylinder member and a piston rod;
(B) support means mounting said power cylinder assembly in a vertical position with said piston rod projecting downwardly out of said cylinder member;
(C) a block member drivingly connected at its upper end to the lower end of said piston rod;
(D) a vacuum cup including a bellows structure secured at its upper end to the lower end of said block member and defining a downwardly opening hollow that is decreased in volume in response to collapse of said bellows structure as said cup is lowered onto a sheet member;
(E) means defining a vacuum cavity including a lower portion defined by the hollow of said vacuum cup and an upper portion defined in said block member; and
(F) valving means including a valve lever pivotally mounted on said block member and defining a cam surface position laterally of said block member, spring means urging said lever to a closed position, and a fixed actuator member rigid with respect to said cylinder, said valving means being operative
  (1) in response to downward movement of said vacuum cup onto a sheet member upon downward movement of said piston rod to pivot said valve lever to an open position against the bias of said spring means to vent said upper portion of said vacuum cavity as said lower portion thereof is decreased in volume by the collapse of said bellows structure,
  (2) in response to termination of such collapse of said bellows structure, to pivot said valve lever under the bias of said spring means to a closed position sealing said upper portion of said vacuum cavity so that as said bellows structure expands in response to subsequent upward movement of said piston rod a vacuum is created in said vacuum cavity to hold the sheet member against said vacuum cup, and
  (3) in response to a predetermined amount of upward movement of said piston rod corresponding to the desired amount of lift to be imparted to the sheet member, to move said valve lever to its open position in response to engagement of said cam surface with said actuator member to vent said vacuum cavity and release the sheet member.

10. A vacuum lift assembly for lifting sheet members, said assembly comprising:
(A) a power cylinder assembly including a cylinder member and a piston rod;
(B) support means mounting said power cylinder assembly in a vertical position with said piston rod projecting downwardly out of said cylinder member;
(C) a block member secured at its upper end to the lower end of said piston rod;
(D) a vacuum cup including a bellows structure secured at its upper end to the lower end of said block member and defining a downwardly opening hollow that is decreased in volume in response to collapse of said bellows structure as said cup is lowered onto a sheet member;
(E) means defining a vacuum cavity including a lower portion defined by the hollow of said vacuum cup and an upper portion defined in said block member; and
(F) valving means operative
  (1) in response to downward movement of said vacuum cup onto a sheet member upon downward movement of said piston rod to vent said upper portion of said vacuum cavity as said lower portion thereof is decreased in volume by the collapse of said bellows structure,
  (2) in response to termination of such collapse of said bellows structure, to seal said upper portion of said vacuum cavity so that as said bellows structure expands in response to subsequent upward movement of said piston rod a vacuum is created in said vacuum cavity to hold the sheet member against said vacuum cup, and
  (3) in response to a predetermined amount of upward movement of said piston rod corresponding to the desired amount of lift to be imparted to the sheet member, to vent said vaccum cavity and release the sheet member;

(G) said valving means including (1) a collar member secured to the lower end of said cylinder member and extending downwardly therefrom in coaxial, surrounding relation to said piston rod and said block member to define a lower annular end, and (2) a lever pivoted to said block member, spring biased into a closed position sealing said upper portion of said vacuum cavity, and including a cam portion engageable with said lower annular end of said collar member upon upward movement of said piston rod to move said lever to an open position venting said upper portion of said vacuum cavity to effect release of a gripped sheet.

* * * * *